Dec. 22, 1925.

J. BECKER

PIPE COUPLER

Filed Feb. 13, 1925

1,566,953

John Becker
INVENTOR.

ATTORNEY

Patented Dec. 22, 1925.

1,566,953

UNITED STATES PATENT OFFICE.

JOHN BECKER, OF WARREN, IDAHO.

PIPE COUPLER.

Application filed February 13, 1925. Serial No. 8,972.

*To all whom it may concern:*

Be it known that JOHN BECKER, a citizen of the United States of America, residing at Warren, in the county of Idaho and State of Idaho, has invented new and useful Improvements in Pipe Couplers, of which the following is a specification.

The purpose of the invention is to provide coupling means for pipes and the like, whereby the necessity for a screw-threaded joint may be avoided, thus making it possible to effect a firm and effective coupling of adjoining pipe sections where it is impracticable to turn one or the other as is necessary in screw-threaded couplings.

With this general object in view, the invention consists in a construction and combination of parts of which a preferred embodiment is illustrated in the accompanying drawings, wherein.

Figure 1:
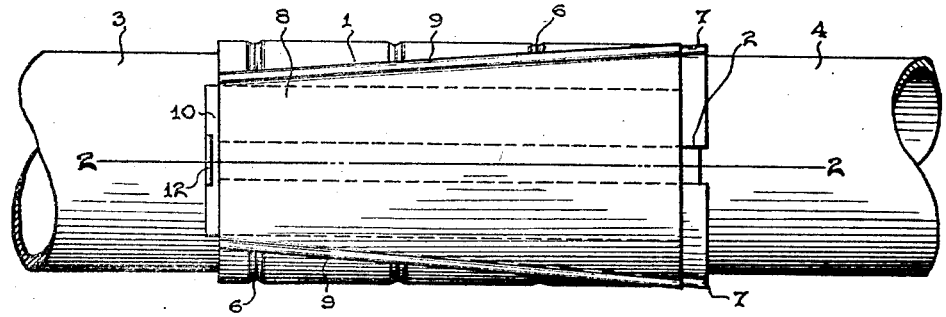
Figure 1 is a plan view showing the connecting ends of adjacent pipe sections with the improved coupling in place.
Figure 2:
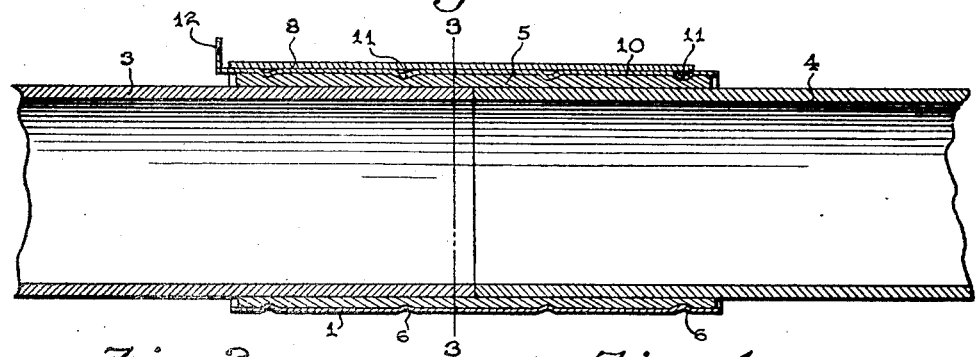
Figure 2 is a longitudinal sectional view on the line 2—2 of Figure 1.
Figure 3:
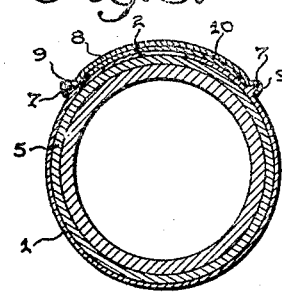
Figure 3 is a transverse sectional view on the line 3—3 of Figure 1.
Figure 4:
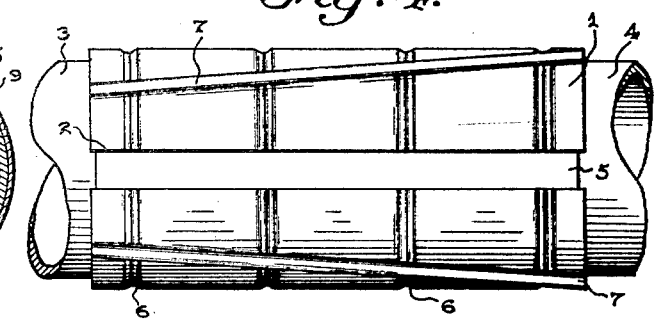
Figure 4 is a detail view illustrating the sleeve on the coupling.
Figure 5:
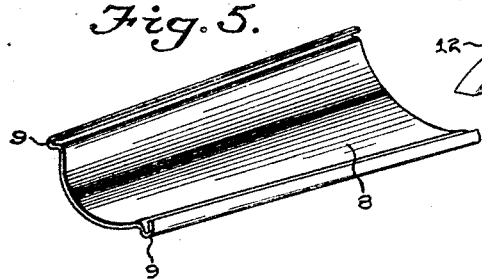
Figure 5 is a detail perspective view illustrating the clamping member.
Figure 6:
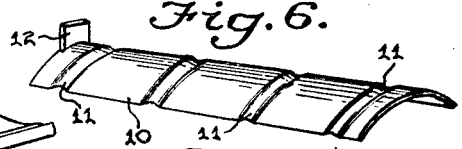
Figure 6 is a similar view illustrating the key.

The sleeve 1 is slit longitudinally, as indicated at 2, to provide for diametrical contraction of the sleeve on the adjoining ends of the pipe sections 3 and 4, a suitable compressible gasket 5 being wrapped around the pipe sections prior to the application of the sleeve which, in order to firmly engage the gasket, is formed with peripheral corrugations constituting inwardly projecting ribs 6.

To provide for the diametrical contraction of the sleeve, it is formed, on opposite sides of the slit 2, with the longitudinal ribs 7, said ribs being disposed in converging relation, so that when the clamp member 8, which is cross sectionally arcuate to correspond to the sleeve and is formed with grooves 9 engaging the ribs, is applied to the sleeve and moved longitudinally of the latter, diametrical contraction of the sleeve may result.

The clamp member and sleeve constitute not only the essential elements but practically all that is required in the coupling, but to insure the clamp member being retained in place, a locking key 10 is provided which is also cross sectionally arcuate and engages between the clamp and the sleeve between the longitudinal ribs 7 on the latter.

The key is preferably inserted at the narrower end of the clamp and is transversely grooved or corrugated to provide inwardly projecting ribs 11 adapted to seat in the corrugations on the face of the sleeve between the ribs on the latter, and its upturned terminal ear 12 abuts the end of the clamp member. The ear may constitute an impact surface for a driving tool in seating the key or in the removal of the latter in the event of the removal of the coupling.

The invention having been described, what is claimed as new and useful is:

1. A pipe coupling consisting of diametrical contractible sleeve, a clamp member having interlocking engagement with the sleeve and adapted to contract the latter upon relative longitudinal movement of the two, and a key member insertable between the clamp member and the sleeve and having transverse ribs engaging transverse grooves formed in the sleeve.

2. A pipe coupling consisting of diametrical contractible sleeve, a clamp member having interlocking engagement with the sleeve and adapted to contract the latter upon relative longitudinal movement of the two, and a key member insertable between the clamp member and the sleeve and having transverse ribs engaging transverse grooves formed in the sleeve, the key member having an ear for terminal engagement with the clamp member.

In testimony whereof he affixes his signature.

JOHN BECKER.